United States Patent [19]

Tufenkian et al.

[11] Patent Number: 4,778,327

[45] Date of Patent: Oct. 18, 1988

[54] BIN LIFTING MECHANISM

[75] Inventors: Ralph S. Tufenkian, Glendale; Raul S. Caballero, Montebello, both of Calif.

[73] Assignee: Western Waste Industries, Gardena, Calif.

[21] Appl. No.: 61,022

[22] Filed: Jun. 10, 1987

Related U.S. Application Data

[63] Continuation of Ser. No. 651,276, Sep. 14, 1984, abandoned.

[51] Int. Cl.[4] .............................................. B65G 67/02

[52] U.S. Cl. .................................. 414/541; 187/9 R; 414/471; 414/477; 414/540; 414/621; 414/549; 414/555

[58] Field of Search ............... 187/9 R; 414/471, 477, 414/541, 621, 631, 632, 542, 549, 539, 540, 555, 786

[56] References Cited

U.S. PATENT DOCUMENTS

| | | | |
|---|---|---|---|
| 2,869,740 | 1/1954 | Dempster | 414/541 |
| 3,521,780 | 7/1970 | Cook | 414/632 |
| 3,715,046 | 2/1973 | Marklund | 414/631 X |
| 4,365,921 | 12/1982 | Brouwer et al. | 414/631 X |
| 4,415,302 | 11/1983 | Brouwer et al. | 414/631 X |

OTHER PUBLICATIONS

Advertisement entitled: Myers Hydra-Lift by Myers Metal Fabricators, Inc., no date, consisting of two pages.

*Primary Examiner*—Frank E. Werner

*Attorney, Agent, or Firm*—Noel F. Heal

[57] ABSTRACT

A truck-mounted lifting mechanism is provided for loading containers, such as waste bins, on a truck so that the container can be positioned where its weight will be reasonably distributed between the front and rear wheels. The lifting mechanism includes a track extending along the length of the truck bed, a tray which can be moved along the length of the track while being restrained by the track from any vertical displacement, and a jack-up assembly attached to and supported by the movable tray. A pair of hydraulic cylinders attached between the tray and the jack-up assembly permit the controlled forward tilting of the jack-up assembly toward the truck cab. In use, the jack-up assembly is utilized to securely grasp the container to be loaded, and lift it vertically until the container bottom is above the upper surface of the truck bed. In this elevated position, the tray can be pulled by another hydraulic ram toward the truck cab to position the container over the truck bed.

6 Claims, 4 Drawing Sheets

BIN LIFTING MECHANISM

This application is a continuation of application Ser. No. 651,276 filed Sept. 14, 1984, now abandoned.

BACKGROUND OF THE INVENTION

This invention relates generally to mechanisms for loading containers onto trucks, and, more specifically, to truck-mounted lifting mechanisms for loading containers onto the trucks for safe transport over intermediate and long hauls.

In the waste disposal industry, a standard disposal bin can hold three to four cubic yards of refuse. Many disposal accessability, such as garages of apartment and condominium complexes, and thus must be moved to other more convenient locations for emptying. Smaller trucks having a rear-mounted tilting forklift mechanism, which only lifts and tilts the container, have been employed in moving these disposal bins. However, due to the size of these trucks and the manner in which they carry containers beyond the rearward edge of the truck bed, they have been considered generally unsuitable for transporting containers over intermediate and long distances. Moreover, the usefulness of these smaller trucks has been further diminished by the increasing use of enlarged waste bins having capacities of eight cubic yards or more. These enlarged bins, when filled with refuse, can often weigh more than the lifting capability of the trucks.

Several manufacturers have begun installing lifting mechanisms on the rear ends of one and two-ton trucks in order to accommodate the new enlarged containers. These one and two-ton trucks are usually maneuverable enough to have access to most remote container storage locations, and yet heavy enough to handle the enlarged containers for at least short hauls. Typically, these larger trucks have employed lifting and tilting mechanisms very similar to those used previously on the smaller trucks. However, since these new larger trucks still generally lift and carry the enlarged containers beyond the rearward edge of the truck bed, several serious and potentially dangerous problems have arisen.

When a container is carried beyond the rear end of a truck bed, the weight of the container is primarily borne by the rear wheels. If the container is full of material, such as refuse, this rearward positioning can create a levered effect on the truck, with the rear wheels supplying the fulcrum. Such a condition can cause the front wheels to bounce off the ground when the truck is moving, resulting in an unsafe driving condition. Moreover, the unbalanced loading of the truck chassis accelerates wear and tear on the truck itself.

Accordingly, there has been a need for an economical and reliable, truck-mounted bin lifting mechanism which can lift and load enlarged containers so that they are positioned over the truck bed for safe transport over intermediate and long hauls. It is preferable that the improved lifting mechanism be capable of positioning the container so that its weight is reasonably distributed between the front and rear wheels. Also, the improved bin lifting mechanism should be able to hold the container securely in place over the truck bed to prevent its unintentional movement with respect to the truck during travel. Moreover, it would be desirable to provide readily accessible controls for the mechanism, both somewhere near the truck bed as well as within the truck cab, to maximize operator control over the lifting and loading of the container or bin. The present invention fulfills these needs and provides other related advantages.

SUMMARY OF THE INVENTION

The present invention resides in a truck-mounted, improved bin lifting mechanism which is capable of quickly, reliably and economically loading a large container onto a truck so that the weight of the container and its contents is reasonably distributed between the front and rear wheels. The improved lifting mechanism comprises a jack-up assembly supported on a tray which can be horizontally moved along the length of the truck bed to ideally position the container substantially over the truck bed. Vertical movement of the tray is severely restricted, or altogether prevented, to resist high turning moment forces imposed on it through the jack-up assembly by the weight of the container.

In a preferred form of the invention, the jack-up assembly is pivotally mounted along the rear edge of the movable tray and is provided with a pair of forks designed to mate with a pair of corresponding standard container sleeves. At least one hydraulic cylinder is attached between the front edge of the movable tray and the jack-up assembly to controllably tilt the jack-up assembly toward the truck cab. This tilting feature can be utilized to prevent the unintentional separation of the container from the forks during the loading operation or while transporting the container.

Built into the truck bed is a track that permits movement of the tray along the length of the truck bed while effectively preventing its vertical movement with respect to the truck bed. The tray is moved along the track by a hydraulic ram, which is anchored near the rear side of the truck cab and to the rear edge of the tray. The control and power elements of the improved bin lifting mechanism are structured to allow the tray maximum forward travel for positioning the container as far forward over the truck bed as possible. This is accomplished, in part, by moving the tray between a hydraulic fluid reservoir/pump, and an outer set of operator controls.

To load a container, such as a waste disposal bin, onto the truck, the jack-up assembly is utilized to grasp and vertically raise the container until the container bottom is above the upper surface of the truck bed. With the container in such an elevated position, the ram is activated to pull the tray toward the truck cab and preferably position it generally between the front and rear wheels of the truck. Before the truck is moved, it is usually desirable to tilt the jack-up assembly, and with it the container, forwardly toward the truck cab to prevent any unintentional separation of the container from the lifting mechanism during transport. Such tilting also further insures that the weight of the container will be transferred to the truck chassis through the tray by preventing the container from resting directly on the truck bed.

By simply reversing the loading procedure, the container can be easily unloaded from the truck as well. For example, by simply extending the ram to position the tray along the rearward edge of the truck bed and then lowering the jack-up assembly, the forks can be withdrawn from the container sleeves by merely moving the truck forward. This ease of operation, when combined with the efficiency and dependability of the hydraulic systems utilized, makes the improved bin lifting mechanism a highly desirable, economical and maintainable piece of equipment for waste hauling and the like.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
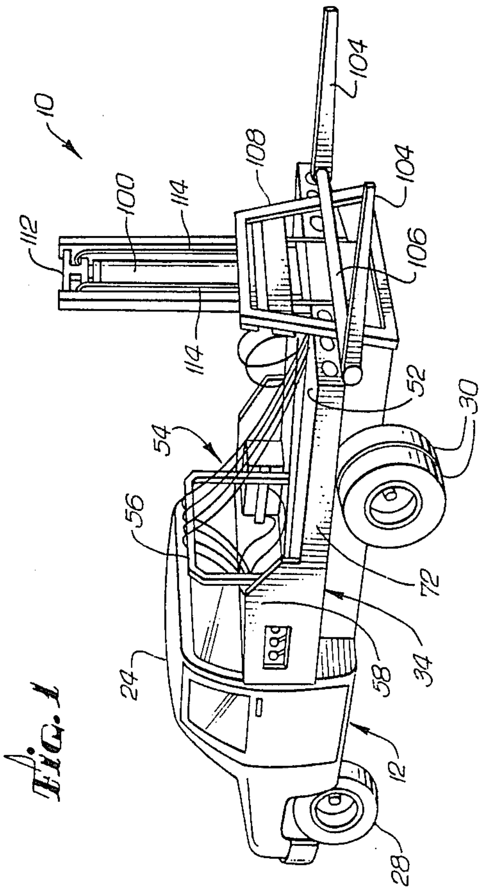
FIG. 1 is a rear perspective view of a truck having an improved bin lifting mechanism embodying the present invention.

As shown in the drawings for purposes of illustration, the present invention is concerned with an improved bin lifting mechanism, generally designated in the accompanying drawings by the reference number 10. The improved bin lifting mechanism 10 is usually mounted on a truck 12 and utilized for loading and carrying containers while they are being transported. In accordance with the invention, the lifting mechanism 10 comprises a jack-up assembly 14, which is supported on a movable tray 16, which in turn is mounted within a track 18 built onto the truck 12. This track 18 allows the tray 16 to be selectively positioned along the length of the truck bed, and effectively prevents any vertical movement of the tray with respect to the truck bed.

In a preferred form, the improved bin lifting mechanism 10 is designed to load and carry an enlarged waste-disposal container 20. A hydraulic ram 22 is positioned within the track 18 and is anchored near the rear side of the truck cab 24. This ram 22 extends from the truck cab 24 to the rear edge of the tray 16 where it is securely attached to permit an operator to control the movement and positioning of the tray along the length of the truck bed. In use, the jack-up assembly 14 functions to raise the container 20 vertically until the container bottom 26 is above the upper surface of the track 18. In such an elevated position, the tray 16 can be pulled by the ram 22 toward the truck cab 24 to position the tray generally between the front and rear wheels 28 and 30 of the truck 12.

The improved bin lifting mechanism 10 of this invention is designed to load an enlarged container onto a truck quickly, efficiently and reliably, for movement to another location. Control of the improved lifting mechanism 10 can be accomplished through standard hydraulic systems, which are beneficially reliable and easily maintained. By moving the tray 16 along the track 18 from the rearward edge of the truck bed forwardly toward the truck cab 24, the weight of the loaded container can be equitably distributed throughout the truck chassis 32, resulting in more stability and control over the truck 12 while transporting the container. Moreover, the various components of the improved bin lifting mechanism 10 can be combined in a manner minimizing frictional wear, thereby prolonging the useful life of such lifting mechanisms.

Any truck large enough to safely transport the size and type of containers that will be carried can be fitted with the improved bin lifting mechanism 10. To haul enlarged waste disposal containers 20, a one-ton truck is preferred because it is usually small enough to access remote container storage locations, and yet is heavy enough to safely transport the enlarged containers. Further, when purchasing trucks with the intent of modifying them by adding the improved bin lifting mechanism 10, it is desirable to obtain the trucks without a standard truck bed already installed. It is preferable to install a specially manufactured truck bed 34, including the track 18 for the movable tray 16, directly onto the truck chassis 32.

In a preferred embodiment of the invention, and as best illustrated in FIGS. 5 through 8, the specially manufactured truck bed 34 includes the track 18, a supporting structure 36 for the track, an outer set of controls 38 for the lifting mechanism 10, and a hydraulic fluid reservoir/pump 40. The track 18 is formed by a pair of horizontally spaced, parallel C-shaped rails 42. A pair of plow blocks 44 are attached to the upper and lower inner surfaces of each rail 42, and these blocks extend the length of the rails to form an acceptable sliding surface for the movable tray 16.

Figure 7:
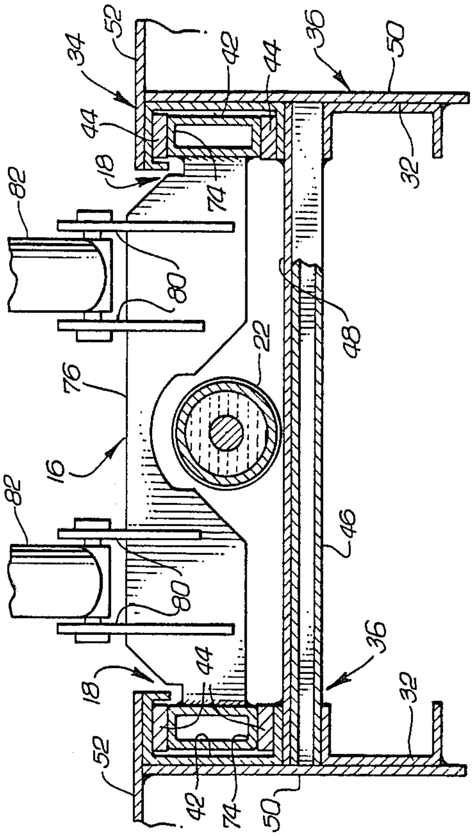
FIG. 7 is an enlarged fragmented sectional view taken generally along the line 7—7 of FIG. 6.
Figure 8:
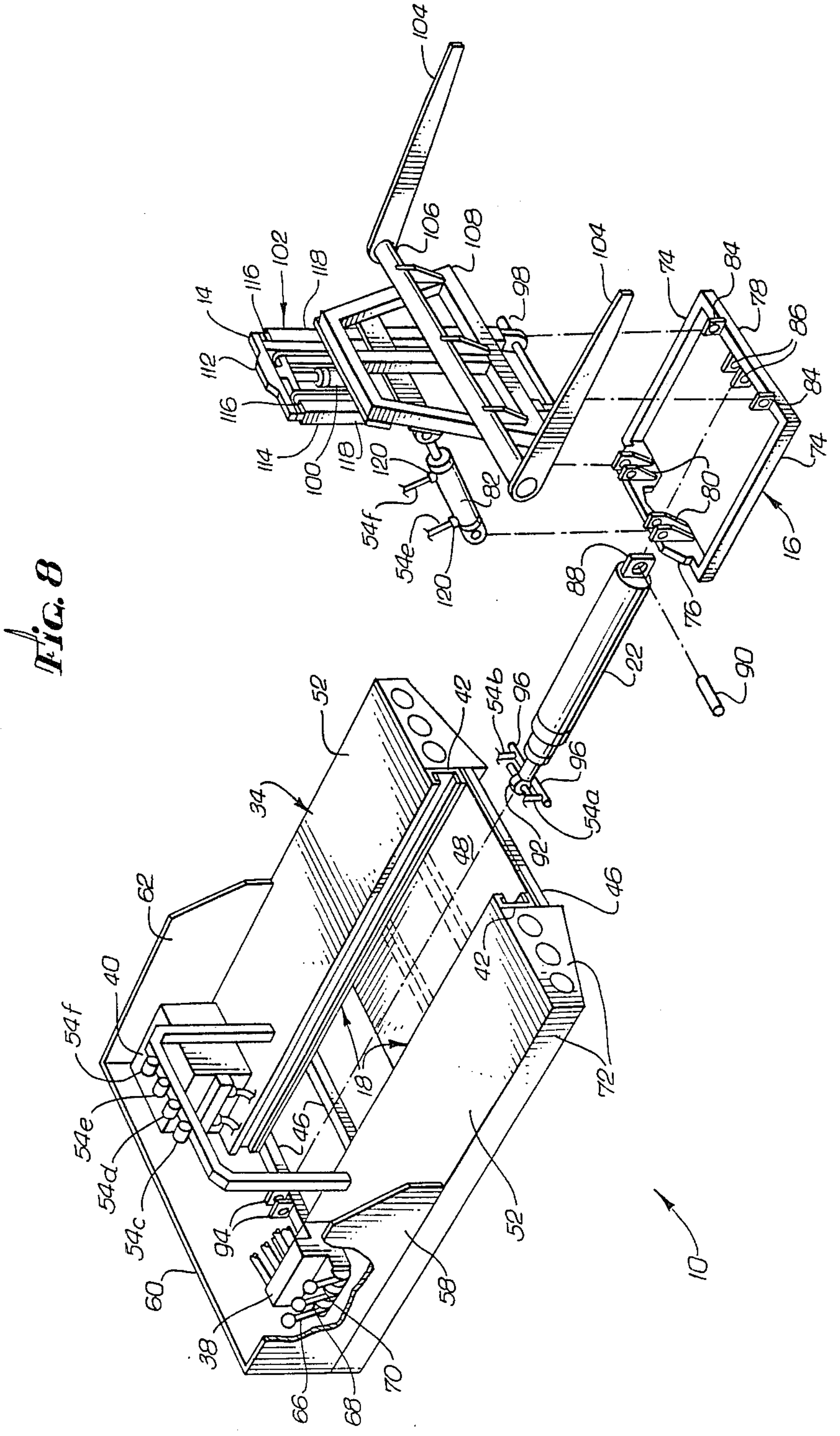
FIG. 8 is an exploded perspective view of the bin lifting mechanism embodying the present invention.

The supporting structure 36 for the track 18 includes a plurality of cross members 46 which lie above and are rigidly attached to the chassis 32. A floor 48 for the track 18 overlies some of these cross members 46 to provide a horizontal supporting surface below the rearward portion of the track, and the C-shaped rails 42 are rigidly attached to the floor and the forwardmost cross members (FIG. 8). It is desirable to position the rails 42 so that they extend throughout their lengths directly above a portion of the chassis 32 to maximize the strength and stability of the track 18 for resisting the high turning forces to be imposed on the track through the tray 16 by the weight of the container 20 and its contents (FIG. 7). Moreover, when the rails 42 are so positioned over the chassis 32, a pair of vertical alignment plates 50, forming a portion of the support structure 36, provide a common surface of attachment for each rail, its underlying portion of the chassis, and the ends of the cross members 46 which are interposed between the rails and the chassis.

A generally horizontal deck 52 covers the top side of each rail 42 and substantially forms the upper surface of the truck bed 34. The hydraulic fluid reservoir/pump 40 is situated on one side of the track 18 near the truck cab 24, and the outer set of controls 38 for the lifting mechanism 10 are mounted on the opposite side of the track. These controls 38 direct hydraulic fluid, in a standard fashion, through a plurality of hydraulic fluid lines 54 to extend or retract a plurality of hydraulic cylinders, which will be described in more detail below. Moreover, an inverted, generally U-shaped support bar 56 is provided immediately behind the controls 38 and the reservoir/pump 40 to position some of the hydraulic fluid lines 54 over the track 18 where they will not interfere with, or be damaged by, movement of the tray 16 and the jack-up assembly 14.

Three upwardly extending walls 58, 60 and 62 partially surround the forward portion of the deck 52 to generally shield the operator controls 38 and the reservoir/pump 40 from view. The side wall 58 adjacent the controls 38 includes a window 64 to allow an operator convenient access to three control handles 66, 68 and 70 for operating the improved lifting mechanism 10. To provide a tail-light housing and improve the overall appearance of the modified truck 12, skirting 72 is provided about the outer edges of the truck bed 34.

The movable tray 16 is a generally rectangular, high-strength member having parallel skids 74 designed to fit securely, yet slidably, within the track rails 42 and between the plow blocks 44. At the forward and rear edges of these skids 74 are attached cross-bars 76 and 78, which provide brackets for pivotally interconnecting the other components of the improved bin lifting mechanism 10. More specifically, the forward cross-bar 76 provides a pair of tilt cylinder support brackets 80 for connecting a pair of hydraulic tilt cylinders 82, which control the angular tilt of the jack-up assembly 14 with respect to the tray 16. Between these tilt cylinder brackets 80, the forward cross-bar 76 has an arched section within which the tray ram 22 passes for connection to the rearward cross-bar 78. The rearward cross-bar 78 provides a pair of bracket tongues 84 for pivotally mounting the jack-up assembly 14, as well as a ram-connecting bracket 86 situated between the jack-up assembly bracket tongues 84 (FIG. 8).

The ram 22 is a heavy duty, three-section hydraulic cylinder which lengthens or shortens to slide the tray 16 in response to fluid flow through its internal passageways. A tongue 88 having a central aperture extends from the rearward end of the ram 22 to fit within the ram-connecting bracket 86 provided on the rearward tray cross-bar 78, and the two are securely attached by a hinge rod 90 passed through the aligned apertures. Almost all connections between the various components of the bin lifting mechanism 10 are accomplished in a similar manner. The forward end of the ram 22 also has a tongue 92, which is secured between a bracket 94 extending upwardly from the forwardmost cross member 46. Adjacent this forward ram tongue 92 are two hydraulic fluid connectors 96, which are each connected to a hydraulic fluid line 54*a* or *b*. Each of these lines 54*a* and *b* feeds into the hydraulic controls 38 in a manner allowing a single control lever, for example the forwardmost lever 66, to control ram movement in a conventional manner.

Figure 5:
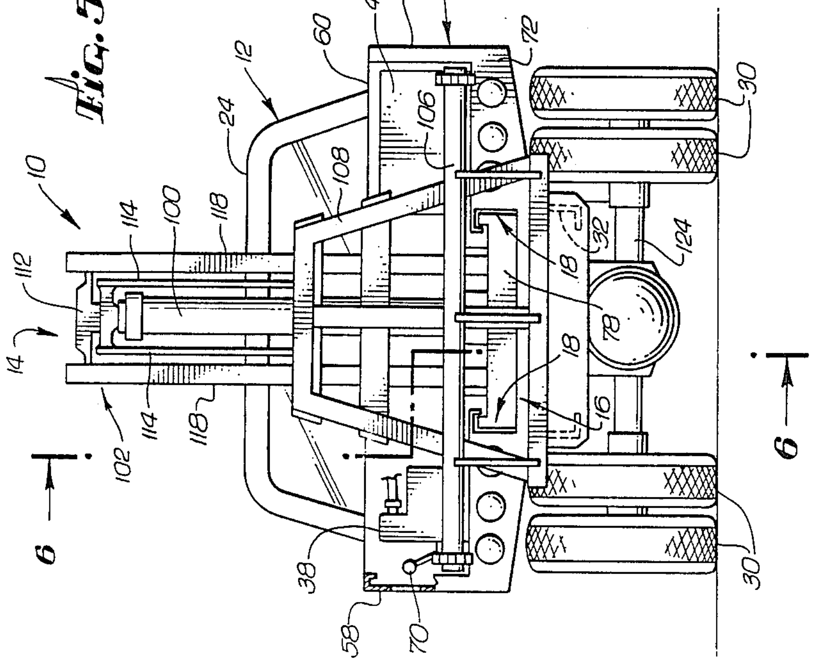
FIG. 5 is a rear elevational view of the truck illustrated in FIG. 1.

The jack-up assembly 14, which is pivotally mounted to the rear tray cross-bar 78 through a hinge rod 98, is very similar to like assemblies found on conventional fork lifts. The jack-up assembly 14 includes a vertical hydraulic cylinder 100 positioned within a support and guiding assembly 102 to raise or lower a pair of forks 104. These forks 104 are rigidly attached to a fork cross-beam 106, which is in turn rigidly positioned by a fork assembly support frame 108 (FIG. 5).

The vertical cylinder 100 is positioned within the jack-up assembly 14 so that its lower end is held stationary, and its upper end is allowed to move in response to the flow of hydraulic fluid. As was the case with the ram 22, the hydraulic fluid is supplied at two distinct ports 110, preferably at the lower, stationary end of the cylinder 100. The fluid lines 54*c* and *d* attached to the vertical cylinder 100 extend to the controls 38, where they are connected in a conventional manner so that a single control lever, for instance the middle lever 68, can control cylinder movement. As the vertical cylinder 100 is caused to lengthen, its upper end raises a pulley structure 112 for supporting a pair of lifting chains 114, which conventionally raise the forks 104 at approximately twice the rate as the vertical cylinder is extending. This generally horizontal pulley structure 112 is rigidly attached to a set of vertical guide shafts 116, which slide within outer guide posts 118 to give the entire jack-up assembly 14 stability throughout the lifting process.

Figure 6:
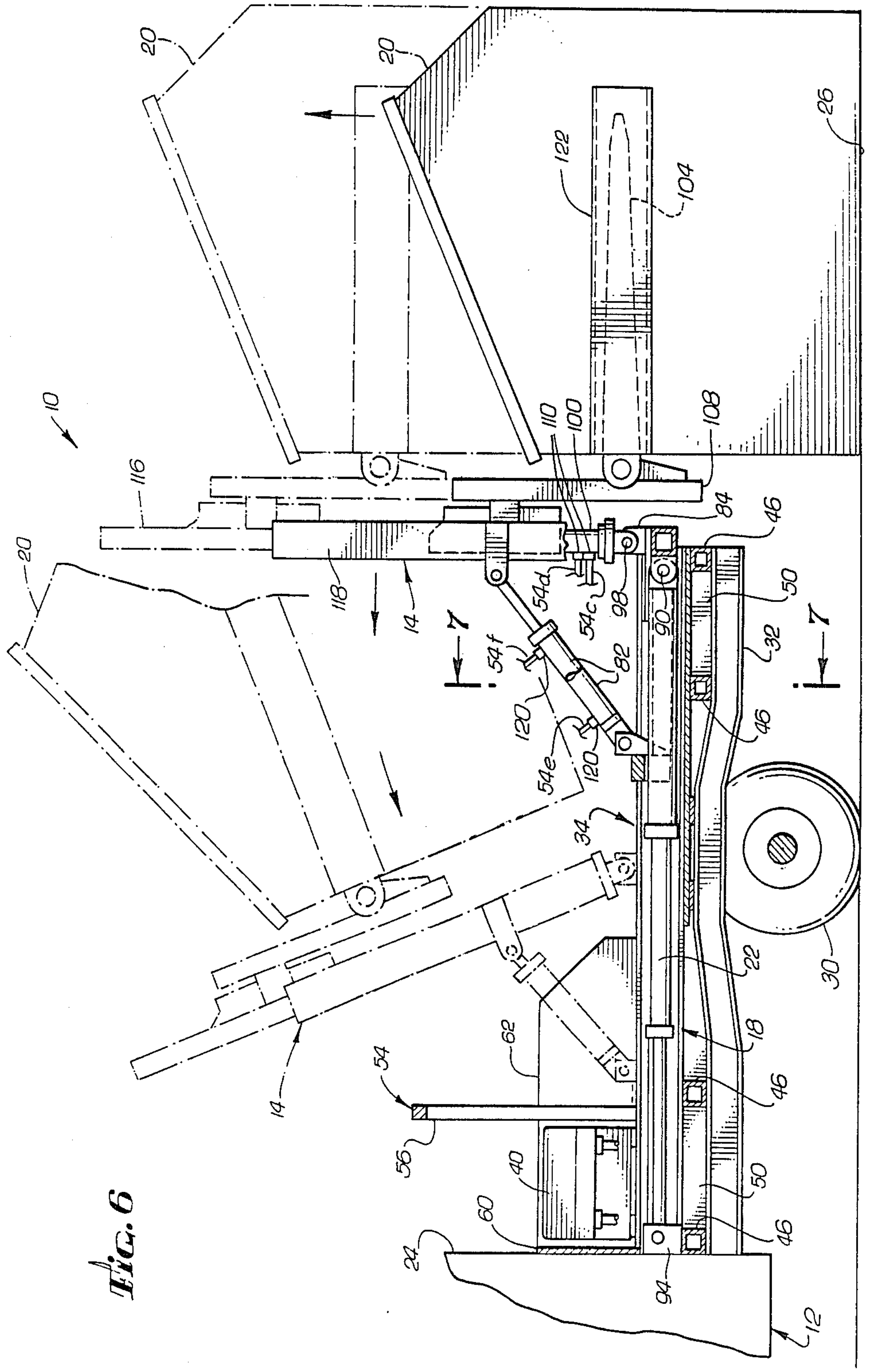
FIG. 6 is a fragmented vertical section taken generally along the line 6—6 of FIG. 5, illustrating an initial loading configuration of the improved mechanism and a container, and exemplary subsequent configurations in phantom.

In many instances, it is desirable to tilt the entire jack-up assembly 14 toward the truck cab 24. For example, an operator may want to tilt the jack-up assembly 14 toward the cab 24 to prevent any unintentional disengagement of the forks 104 from the container 20 during transport. To provide such a feature, the tilt cylinders 82 are connected between the forward tray cross-bar 76 and the outer guide posts 118 of the jack-up assembly 14 (FIG. 6). These tilt cylinders 82 must be similarly attached to both the tray 16 and the guide posts 118, as well as to the hydraulic fluid feed lines 54*e* and *f*, so that they operate together in an identical fashion for smooth operation. Only two hydraulic fluid lines 54*e* and *f* should supply both tilt cylinders 82 to insure such identical function, each line being split somewhere between the cylinders and the controls 38 for attachment at similar ports 120 on each cylinder.

One pair of hydraulic fluid lines 54*c* and *d* extends from the controls 38 rearwardly to the vertical cylinder 100 and another pair of similar lines 54*e* and *f* extends to the tilt cylinders 82, and care must be taken not to damage these lines when the tray 16 is moved forward toward the truck cab 24. It has been found that these lines 54*c*–*f* can be kept clear of the track 18 by simply running them over the top of the support bar 56. Such positioning of the fluid lines 54*c*–*f*, when combined with the inherent stiffness of the lines, will prevent their drooping into the tray pathway where they can be damaged.

Importantly, forward movement of the tray 16 can be maximized by such positioning the fluid lines 54 where they will not be damaged by movement of the tray along the track 18, and by situating the controls 38 and the reservoir/pump 40 on either side of the track so as not to interfere with tray movement. Maximum forward movement of the tray 16 allows the weight of the container 20, which is normally borne by the truck 12 through the tray, to be ideally distributed on the truck chassis 32, between the front and rear wheels 28 and 30. Even when the weight of the container 20 is placed directly on the truck bed deck 52, the further forward such weight is located, the better the stability and handling of the truck 12.

To illustrate the operation of the improved bin lifting mechanism 10, the loading and unloading of an enlarged waste disposal container 20 having fork receiving sleeves 122 will be described. As best illustrated in FIGS. 1 and 6, the operator must initially position the forks 104 so that as the truck 12 is backed up against the container 20, the forks will be received within the container sleeves 122. After the forks 104 are so positioned, the operator can then leave the truck cab 24 and stand beside the outer controls 38 to better observe the lifting and loading process.

Figure 2:
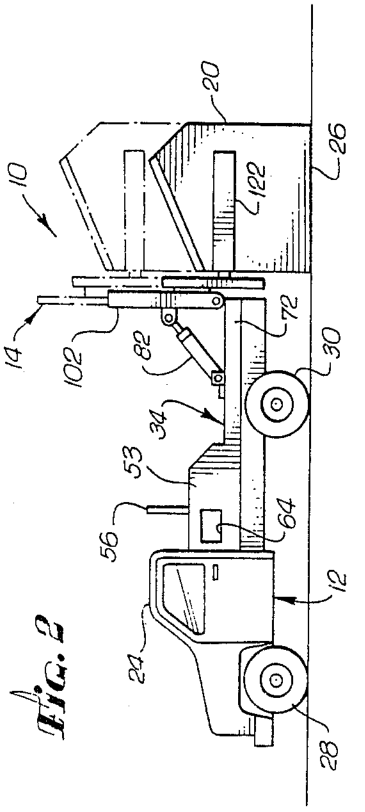
FIG. 2 is a side elevational view of the truck illustrated in FIG. 1, showing the manner in which a jack-up assembly vertically lifts a container.

Typically, the operator will activate one of the control levers 68 to cause the vertical cylinder 100 to lengthen and consequently raise the jack-up assembly 14. As illustrated in FIGS. 2 and 6, when the jack-up assembly 14 is raised, the forks 104 simultaneously move upwardly and lift the container 20.

Figure 3:
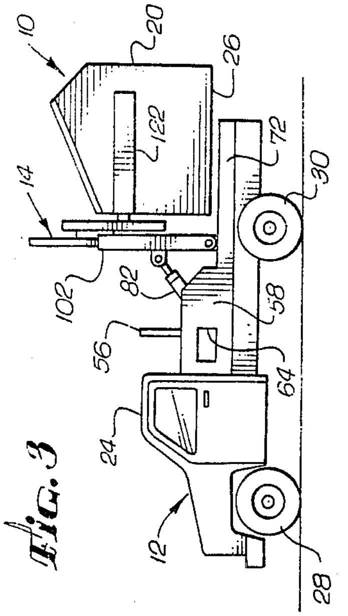
FIG. 3 is a view similar to that shown in FIG. 2, illustrating the positioning of the container over the truck bed after the jack-up assembly has been moved toward the truck cab.

After the container 20 has been raised so that its bottom 26 is above the upper surface of the truck bed deck 52, it can be moved toward the truck cab 24 for more equitably distributing the weight of the container between the front and rear wheels 28 and 30. In this vertically raised position, the operator has the choice of either moving the container 20 directly over the truck bed 34 (FIG. 3), or first tilting the jack-up assembly 14 toward the truck cab 24 before such horizontal movement toward the cab. For purposes of illustration, the jack-up assembly 14 will first be tilted before final container positioning over the truck bed 34.

By activating the appropriate control lever 70, the operator can retract the tilt cylinders 82, causing the jack-up assembly 14 to pivot toward the truck cab 24 about its lower pivotal connection to the movable tray 16. Such tilting is desirable to eliminate any possibility of the container 20 becoming unintentionally separated from the forks 104. Further, in such a tilted position the operator can easily position the container 20 in a manner insuring that its weight is transferred to the truck chassis 32 through the tray 16, rather than through the deck 52.

Figure 4:
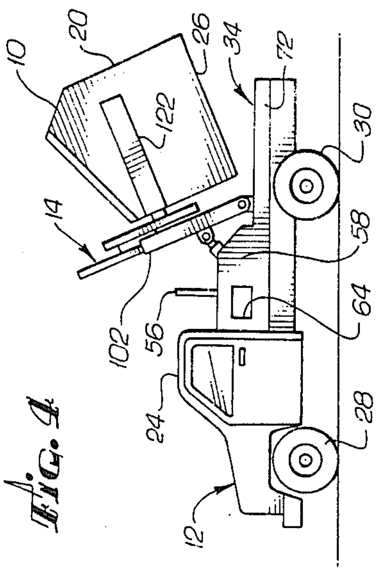
FIG. 4 is a view similar to that shown in FIGS. 2 and 3, illustrating how the jack-up assembly, and consequently the container, can be tilted toward the cab to prevent an unintentional separation of the container from the jack-up assembly during movement of the truck.

After being tilted, the jack-up assembly 14 can be pulled toward the truck cab 24 by simply activating the hydraulic ram 22 until it is positioned to carry the container 20 substantially over the truck bed 34 (FIG. 4). In such a position, and particularly with the jack-up assembly 14 tilted toward the truck cab 24, the weight of the container 20 is transferred through the jack-up assembly to the tray 16, which in turn transfers that weight to the truck chassis 32. With the container 20 suspended above the truck bed 34, the tray 16 can be positioned to transfer the weight of the container to the truck chassis 32 between the front and rear wheels 28 and 30, in spite of the fact that a substantial portion of the container may be yet positioned rearward of the rear axle 124.

Once the container 20 is acceptably loaded onto the truck 12, the operator can then safely transport it to another location. At the new location, the improved bin lifting mechanism 10 can quickly can reliably unload the container 20 just as easily as it was loaded by simply reversing the steps of the loading procedure. For example, the ram 22 can be extended to position the rearward tray cross-bar 78 along the rearward edge of the truck bed 34. The tilt cylinders 82 can next be extended to vertically position the jack-up assembly 14, and the jack-up assembly can then be lowered until the container 20 is placed on the ground.

It should be understood that the above-described loading and unloading procedure is merely exemplary, and that the ultimate positioning of the container 20 over the truck bed 34, as well as the sequence with which the various component parts of the bin lifting mechanism 10 are moved to effect that positioning, can be varied in many different ways. For example, it may be deemed desirable to tilt the jack-up assembly 14 immediately after inserting the forks 104 within the container sleeves 122. The forks 104 can be raised in this tilted position rather than vertically as previously described.

Further, when moving the truck 12 without carrying a container 20, the tray 16 and jack-up assembly 14 should be positioned preferably completely over the truck bed 34. The purpose of so placing the jack-up assembly 14 is to position the forks 104 so as not to create a safety hazard for following vehicles.

As can be seen from the foregoing, the ease of operation, when combined with the efficiency and dependability of the hydraulic systems utilized, makes the improved bin lifting mechanism 10 a highly durable, economical and maintainable piece of equipment for waste disposal container hauling and the like. The improved lifting mechanism 10 can lift enlarged containers 20 for loading and positioning them for safe transport over intermediate and long hauls. This is accomplished by positioning the loaded container 20 over the truck bed 34 so that the load is distributed between the front and rear wheels 28 and 30, rather than attempting to carry the container beyond the rearward edge of the truck bed. The lifting mechamism 10 described can also carry the container 20 in a manner preventing its unintentional separation from the jack-up assembly 14 during movement.

Although a particular embodiment of the invention has been described in detail for purposes of illustration, various modifications may be made without departing from the spirit and scope of the invention. For example, two-ton trucks could be used almost equally as well for hauling enlarged waste disposal bins as one-ton trucks. Moreover, modifications can be made to the lifting mechanism 10 itself to tailor its function and operation to the needs of the user. For instance, the tray 16 and track 18 combination could be modified to include rollers which would minimize the friction between the track and tray. Further, controls for the hydraulic system of the illustrated bin lifting mechanism 10 can be provided within the truck cab 24 in addition to those provided on the truck bed 34. Accordingly, the invention is not to be limited, except as by the appended claims.

We claim:

1. A lifting mechanism for loading and unloading a container onto a truck, said mechanism comprising:

a truck bed having two other, generally coplanar floor sections, structurally joined by recessed cross-members defining a central recessed floor section between the coplanar floor sections;

a horizontal track including two parallel, horizontally spaced rails of C-shaped cross-section supported in the recessed floor section of the truck bed and extending generally rearwardly from the cab of the truck;

a horizontal rectangular tray having two opposite and relatively long sides slidably engaged in the C-shaped rails, wherein the engagement of the long sides of the tray in the rails is effective to resist high turning moment forces imposed on said tray by loads supported by the lifting mechanism, said tray being capable of moving substantially the length of said track;

a jack-up assembly mounted generally along a rearward edge of said tray, said assembly being capable of securely grasping and lifting the container to at least a height where the bottom of the container is above the top of said track;

means for pivoting said jack-up assembly about its connection to said tray, said pivoting means including a hydraulic ram with one end attached to the jack-up assembly and another end attached to a forward edge of said tray, to transfer pivoting forces and load weight forces directly to the truck through the rails, and permitting an operator to tilt said jack-up assembly toward the truck cab; and a second hydraulic ram for controllably moving said tray along the length of said track, wherein said second ram is capable of pulling said jack-up assembly toward the truck cab until said jack-up assembly is situated generally between the front and rear wheels of the truck, thus allowing the container to be supported substantially over the coplanar and recessed floor sections comprising the truck bed for transporting the container over intermediate and long distances.

2. A lifting mechanism as set forth in claim 1, wherein said jack-up assembly includes a pair of forks for securely grasping and lifting the container.

3. A lifting mechanism as set forth in claim 2, wherein said jack-up assembly further includes:

a pair of generally vertical guideposts pivotally attached to a rearward edge of said tray;

cross-bracing means connecting the vertical guideposts together as a unitary structure;

a fork assembly, including said pair of forks, the fork assembly being mounted for sliding movement with respect to the vertical guideposts; and a third hydraulic ram connected to impart generally vertical movement to the fork assembly, to raise and lower it with respect to the vertical guideposts.

4. A lifting mechanism as set forth in claim 3, wherein:

there are two hydraulic rams in the means for pivoting the jack-up assembly, each attached by one end to a different one of the vertical guideposts, and by the other end to the forward edge of the tray; and the weight of the container is transferred to the truck bed directly by the vertical guideposts and the tray, through points of pivotal mounting of the guideposts at the rearward edge of the tray, and through the means for pivoting the jack-up assembly, connected to the forward edge of the tray.

5. A lifting mechanism as set forth in claim 4, wherein the two hydraulic rams in the means for pivoting the jack-up assembly are attached to the vertical guideposts in such a position as to provide a maximum tilt angle of at least thirty degrees.

6. A lifting mechanism as set forth in claim 1, wherein:

said second hydraulic ram is attached by one end to one of the cross-members at the forward end of the recessed floor section, and by the other end to the rearward edge of the tray; and the forward edge of the tray is curved to provide clearance for the second hydraulic ram.

* * * * *

UNITED STATES PATENT AND TRADEMARK OFFICE
CERTIFICATE OF CORRECTION

PATENT NO. : 4,778,327

DATED : Oct. 18, 1988

INVENTOR(S) : Ralph S. Tufenkian et al.

It is certified that error appears in the above-identified patent and that said Letters Patent is hereby corrected as shown below:

Column 1, line 15 after the word "disposal" insert -- bins of this size are stored in areas of limited --.
Column 7, line 55 the second word "can" should be -- and --.
Column 8, line 52 the word "other" should be -- outer --.

Signed and Sealed this

Eleventh Day of June, 1991

*Attest:*

HARRY F. MANBECK, JR.

*Attesting Officer* *Commissioner of Patents and Trademarks*